United States Patent [19]
Toji et al.

[11] Patent Number: 5,752,098
[45] Date of Patent: May 12, 1998

[54] AUTO FOCUSSING METHOD AND DEVICE

[75] Inventors: Shigeo Toji; Masanori Yoshida; Atsushi Misawa, all of Saitama, Japan

[73] Assignee: Fuji Photo Film Co., Ltd., Kanagawa, Japan

[21] Appl. No.: 904,933

[22] Filed: Aug. 1, 1997

Related U.S. Application Data

[63] Continuation of Ser. No. 625,812, Apr. 4, 1996, abandoned.

[30] Foreign Application Priority Data

Apr. 5, 1995  [JP]  Japan .................. 7-080540

[51] Int. Cl.$^6$ ...................................... G03B 13/36
[52] U.S. Cl. ...................... 396/85; 396/87; 396/78
[58] Field of Search ............. 396/75, 78, 85–88

[56] References Cited

U.S. PATENT DOCUMENTS

| | | | |
|---|---|---|---|
| 4,935,763 | 6/1990 | Itoh et al. | 354/400 |
| 4,942,417 | 7/1990 | Miyazawa et al. | 354/400 |
| 4,974,003 | 11/1990 | Ohnuki et al. | 354/400 |
| 4,994,842 | 2/1991 | Itoh et al. | 354/402 |
| 5,200,860 | 4/1993 | Hirasawa et al. | 354/400 |
| 5,486,860 | 1/1996 | Shiokawa et al. | 348/354 |
| 5,537,174 | 7/1996 | Ishikawa | 354/195.12 |

*Primary Examiner*—Safet Metjahic
*Assistant Examiner*—Michael Dalakis

[57] ABSTRACT

A zoom optical system (25) is associated with an image sensor (46), which is disposed behind the zoom optical system for picking up an object (6). The zoom optical system is focussed by use of a photoelectric signal from the image sensor. In a setup mode, the zoom optical system is zoomed from a first magnification to a preset magnification. The zoom optical system has been set at the first magnification. The preset magnification is adapted to focussing. The zoom optical system is focussed in accordance with the photoelectric signal generated while the zoom optical system has the preset magnification. The zoom optical system is zoomed back from the preset magnification to the first magnification, while keeping the zoom optical system in-focus. The zoom optical system becomes in-focus at the first magnification in a manner in which the zoom optical system is in-focus at the preset magnification.

33 Claims, 7 Drawing Sheets

F I G. 5A
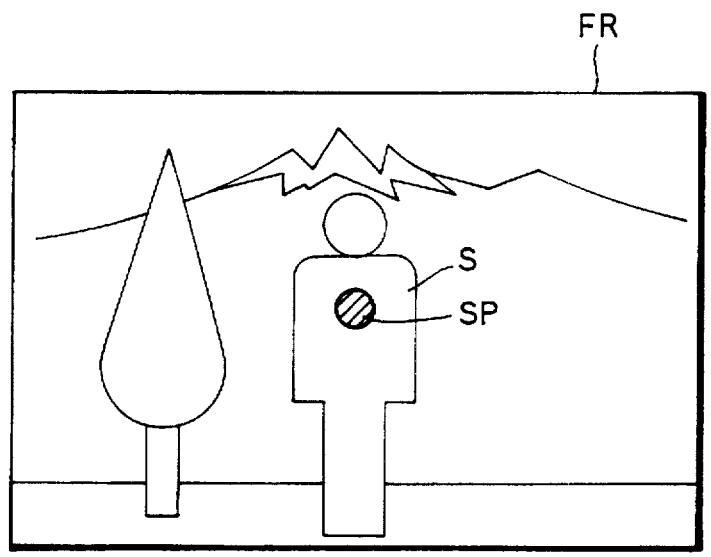

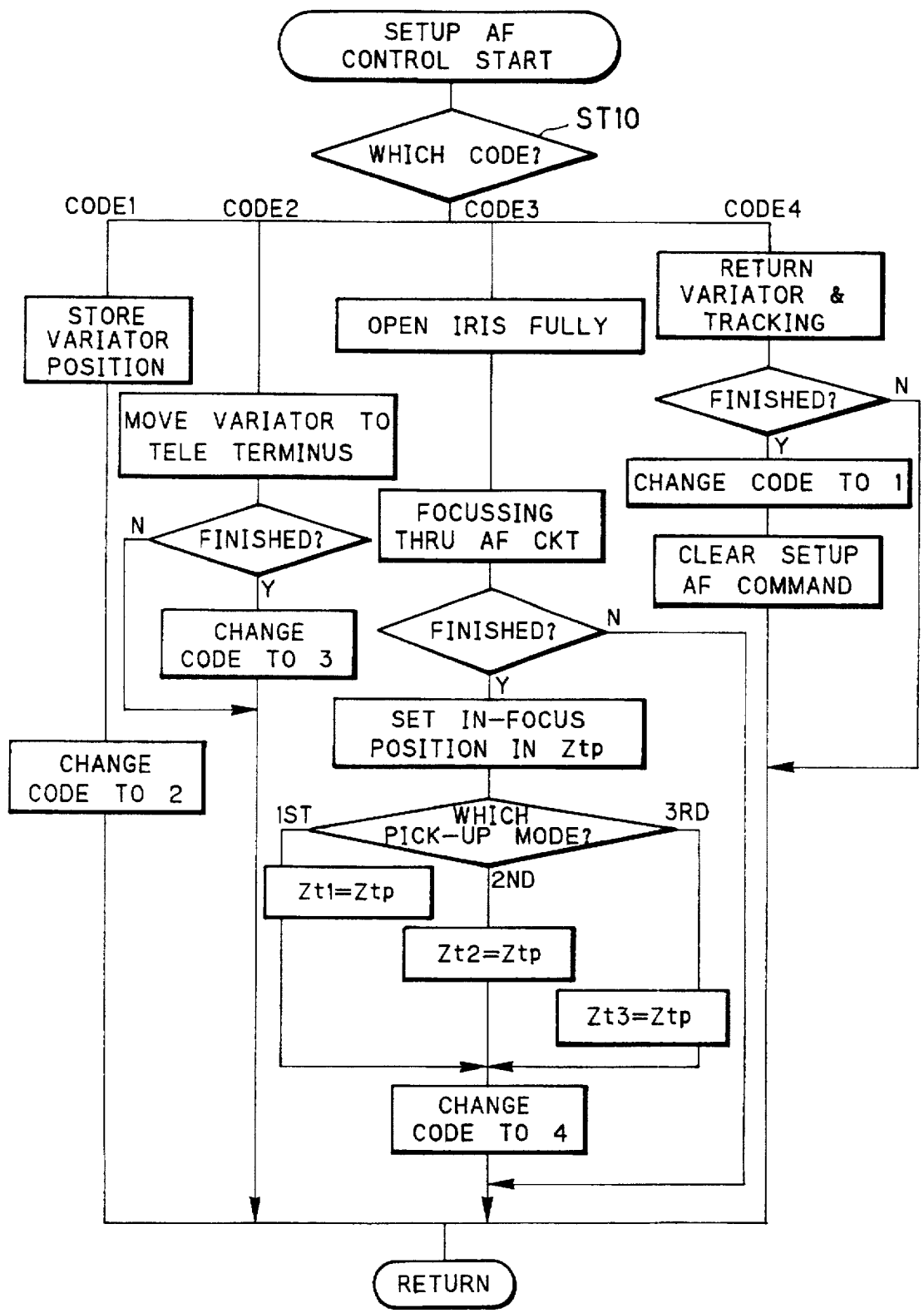

AUTO FOCUSSING METHOD AND DEVICE

This application is a continuation, of application Ser. No. 08/625,812 filed on Apr. 4, 1996, now abandoned.

BACKGROUND OF THE INVENTION

1. Field of the Invention

The present invention relates to an auto focussing method and device for an optical system. More particularly, the present invention relates to an auto focussing method and device for a zoom optical system, in which the zoom optical system can be focussed to an object to be photographed rapidly and properly even when the zoom optical system is zoomed.

2. Description Related to the Prior Art

An auto focussing (AF) device of a contrast detecting type is known. Contrast in an image of an object to be photographed becomes the highest when the object is sharply focussed. An image sensor known as a solid-state pick-up element of a CCD or MOS type is disposed on a focal plane of an objective, which is focussed by monitoring a peak of a high-frequency component included in a photoelectric signal from the image sensor within a predetermined range of frequency. The AF device effects a feedback control: the image sensor generates the signal continuously; differences in brightness between adjacent pixels are added up; a peak of a sum of the added differences is detected. This type is suitable for example for a video camera. The contrast detecting type and a phase difference detecting type are included in a through-camera-lens (TCL or TTL) method.

An image inputting apparatus for picking up an image to output a video signal is known as a variant of a video camera. The image imputing apparatus includes an image sensor which picks up the image from a photo film or a photo print, and generates a photoelectric signal, which is subjected to signal processing. The video signal in form according to an NTSC method is produced, and input to a CRT monitor display or a video printer. An example of image inputting apparatus is FUJIX FOTOVISION FV7 (trade name) manufactured by Fuji Photo Film Co., Ltd.

The image inputting apparatus incorporates a zoom optical system as an objective, for enlarging or reducing a size of an image to be observed as much as desired. The zoom optical system is placed at as short a distance to the object to be picked up as 10-30 mm, as the object is the photo film (negative or positive). This is for operability and generally reduced size of the image inputting apparatus. Although most of video cameras have a zoom optical system of an inner focussing type (rear-focussing type) in which a focussing lens is behind a variator lens, it is preferable to provide the image inputting apparatus with a front-focussing type of zoom optical system in which a variator lens is behind a focussing lens, for the reason of keeping optical performance of the zoom optical system under the short subject distance.

The movement of the focussing lens included in the front-focussing type inevitably causes a focal length of the zoom optical system to change. If the focussing lens is moved according to the contrast detecting technique or the phase difference detecting technique after the zooming operation, the magnification is changed even after the zooming is finished. This is unfavorable particularly when the zoom optical system is zoomed toward a Wide-angle terminus.

If the optical system is zoomed toward the Wide-angle terminus and with a small aperture stop, a depth of focus is the greater. When the zoom magnification is changed during the focussing, a change in the contrast due to the zooming is likely to be more conspicuous than a change in the contrast due to the shift of focus. The AF device cannot operate properly, because it is likely automatically to follow changes in contrast due to the zooming, not due to the shift of focus.

In the case of the greater depth of focus, the magnification is changed due to the set position of the focussing lens within the range of the depth of focus. It is highly difficult to determine a zooming position of one magnification only by zooming operation.

SUMMARY OF THE INVENTION

In view of the foregoing problems, an object of the present invention is to provide an auto focussing method and device for a zoom optical system, in which the zoom optical system can be focussed to an object to be photographed rapidly and without unwanted influences even when the zoom optical system is zoomed.

In order to achieve the above and other objects and advantages of this invention, a zoom optical system, in a setup mode, is zoomed from a first magnification to a preset magnification, the zoom optical system having been set at the first magnification, the preset magnification being adapted to focussing. The zoom optical system is focussed in accordance with the photoelectric signal generated while the zoom optical system has the preset magnification. The zoom optical system is zoomed back from the preset magnification to the first magnification, while keeping the zoom optical system in-focus, whereby the zoom optical system becomes in-focus at the first magnification in a manner in which the zoom optical system is in-focus at the preset magnification.

In a preferred embodiment, the preset magnification is preset high by one telephoto position in a zoomable range of the zoom optical system.

The photoelectric signal, generated while the zoom optical system has the preset magnification, is evaluated. The zoom optical system is focussed in accordance with evaluation of the photoelectric signal, to form an image of the object on the image sensor in an optimized fashion, whereby the zoom optical system is set in a reference in-focus condition. A first in-focus condition is obtained in accordance with the reference in-focus condition, the first in-focus condition being adapted to focussing the zoom optical system when at the first magnification. The zoom optical system is reset from the reference in-focus condition to the first in-focus condition, at a same time as the zoom optical system is zoomed back from the preset magnification to the first magnification.

The zoom optical system includes a variator lens, being movable on an optical axis to zoom, and having a magnification position according to which a magnification is determined, and a focussing lens, being movable on the optical axis to focus, for forming the object image on the image sensor.

Plural tracking data are preset, each of the tracking data representing a combination of the magnification position and an in-focus position of the focussing lens set on an in-focus condition, there being plural reference in-focus positions which the focussing lens has on the reference in-focus condition, the plural tracking data being associated respectively with the plural reference in-focus positions at the preset magnification. A first in-focus position is read in accordance with the tracking data, the focussing lens having the first in-focus position on the first in-focus condition, the first in-focus position being combined with a first magnification position, the variator lens having the first magnification position when at the first magnification, whereby the focussing lens is set in the first in-focus position when the variator lens is moved back to the first magnification position.

BRIEF DESCRIPTION OF THE DRAWINGS

The above objects and advantages of the present invention will become more apparent from the following detailed description when read in connection with the accompanying drawings, in which:

FIG. 5A is an explanatory view illustrating a relationship of a pick-up plane of an image sensor and measuring zones; and FIG. 6 is a flow chart illustrating a flow of a setup AF control.

DETAILED DESCRIPTION OF THE PREFERRED EMBODIMENT(S) OF THE PRESENT INVENTION

Figure 1:
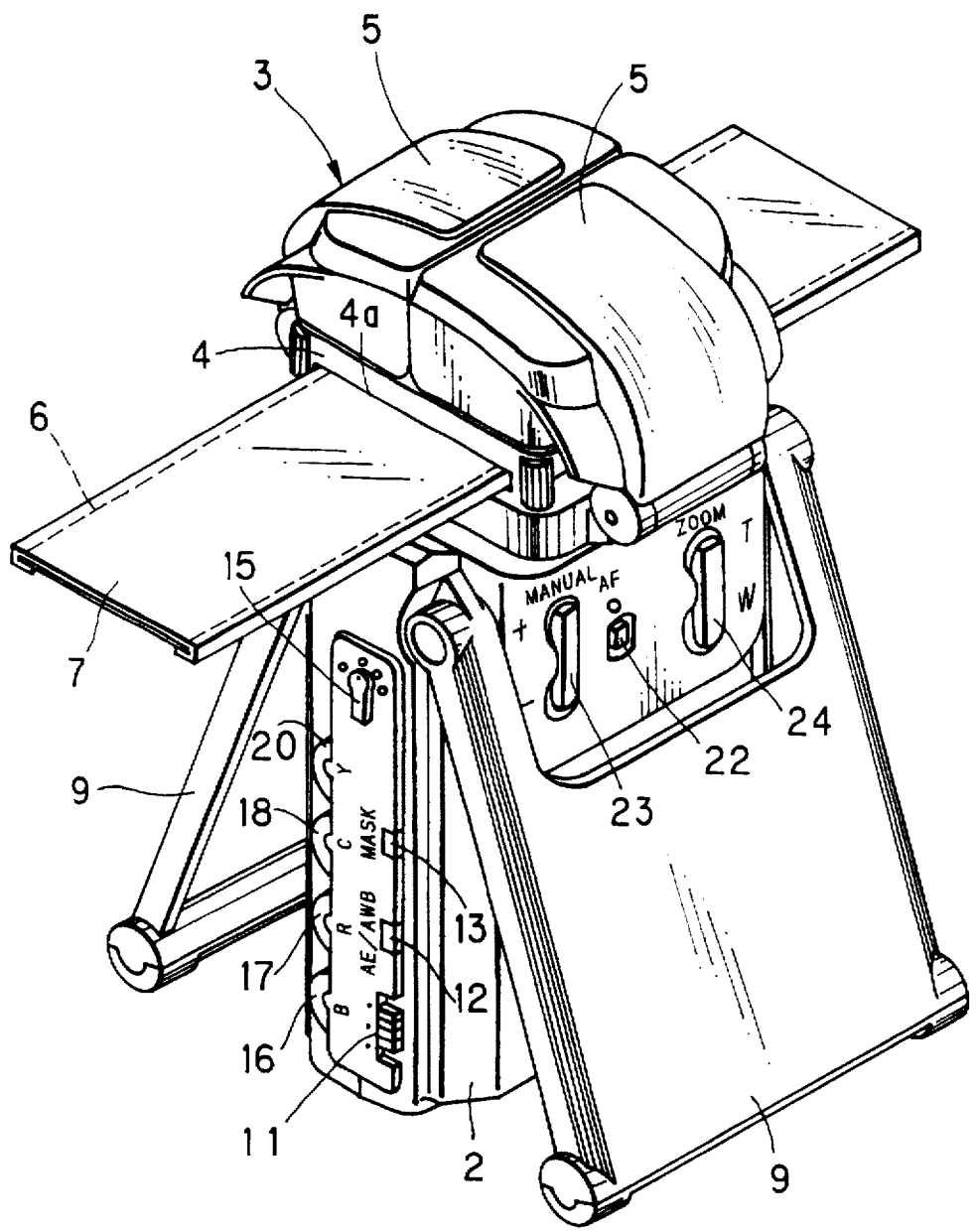
FIG. 1 is a perspective illustrating an image inputting apparatus of the present invention.

In FIG. 1, an image inputting apparatus is illustrated. An illuminating head 3 is disposed in a top of a body 2. The illuminating head 3 includes a support 4 in which a slot 4a is formed, and a pair of light source units 5 supported on the support 4 openably in swingable fashion. A piece of developed photo film 6 includes six (6) frames, and inserted in a photo film holder 7, which is inserted through the slot 4a. When the light source units 5 are turned on, its illuminating light illuminates the photo film 6 from its back surface toward the front surface, and in dispersion through the photo film holder 7 having translucency of white color.

A pair of support legs 9 are supported on the body 2 in swingable fashion. When the support legs 9 are swung open, the body 2 can stand in an erect orientation as depicted. The body 2 incorporates a zoom optical system and an image sensor known as a solid-state pick-up element of a CCD or MOS type, to pick up an image on the photo film 6 as a still image. The photo film 6 may be any of color negative film, color positive film, and monochromatic film. A mode selector lever 10 may be operated in accordance with the film type, to process a signal required for negative-positive conversion. The illuminating head 3 is swingable relative to the body 2 at the support 4 as much as 90 degrees, and adapted to either of horizontal and vertical orientations in which an image of the photo film 6 is recorded.

It is possible to swing the support legs 9 toward the top over the depicted level, and open the light source units 5 to support the body 2 in an upside-down orientation. A photo print can be placed on a table under the image inputting apparatus, illuminated by the light source units 5, and picked up. It is also possible for a user to open the light source units 5 and hold the body 2 manually like an ordinary video camera, to target articles as an object for picking up its image.

The body 2 includes manual inputs as follows:

(1) Power switch 11: operated for turning on/off the power source, and also for turning on/off an inverter 65 (See FIG. 2) electrically connected to the light source units 5.

(2) AE/AWB (Auto) switch 12: turned on to automate adjustment of color (white balance and chrominance) and adjustment of brightness (or luminance). When the AE/AWB switch 12 is turned off, then volume dials 16–20 are rendered effective for manual adjustment of the color and brightness of an image.

(3) Mask switch 13: operable for electrically masking marginal areas inside a frame when the frame is displayed in a CRT monitor display, in accordance with any status of a panoramically recorded frame and the horizontal and vertical orientations. The status set through the mask switch 13 is changed in a chained manner, one to another. In other words, a selected one of the statuses depends on the number of depression of the mask switch 13.

(4) Mode selector switch 15: operable for selecting one of plural pick-up modes. The mode selector 15 is operated when an object to be picked up is changed.

(5) Manual volume dials 16–20: to adjust Red and Blue colors, chrominance (C), and brightness (Y). The manual volume dials 16–20 are rendered effective when the AE/AWB switch 12 is turned off.

(6) AF switch 22: to select the auto focussing (AF) or the manual focussing, and to start a setup AF mode.

(7) Manual focussing switch 23: operable for the manual focussing. The manual focussing switch 23 is structured as a seesaw type for positive and negative directions, and depressed at either of distal ends according to one direction as desired.

(8) Zoom switch 24: operable for zooming. The zoom switch 24 is a seesaw type for telephoto and wide-angle directions.

Figure 2:
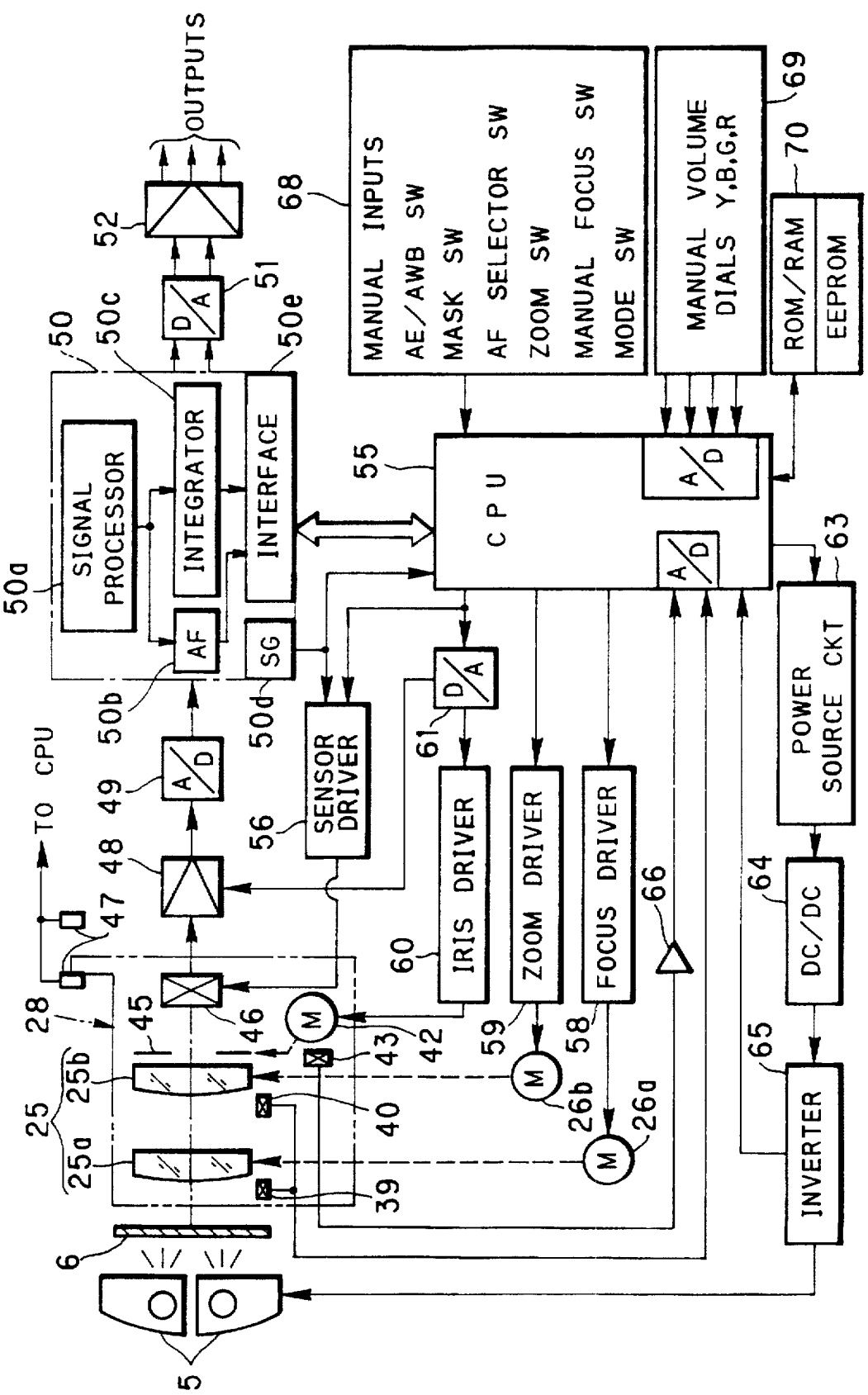
FIG. 2 is a block diagram illustrating the image inputting apparatus.

FIG. 2 is referred to now. A zoom optical system 25 consists of a focussing lens 25a and a variator lens 25b, and is a front-focussing type in which the focussing lens 25a is nearer to an object to be picked up than the variator lens 25b, and movable for the focussing. Note that it is possible to dispose a stationary convex lens nearer to the object than the focussing lens 25a to set a range optically covering slantingly incident beams, in view of a distance of the photo film 6 from the zoom optical system 25, as near as 10–30 mm. It is also possible to add a stationary lens between the variator lens 25b and the image sensor for compensating various aberrations.

Figure 3:
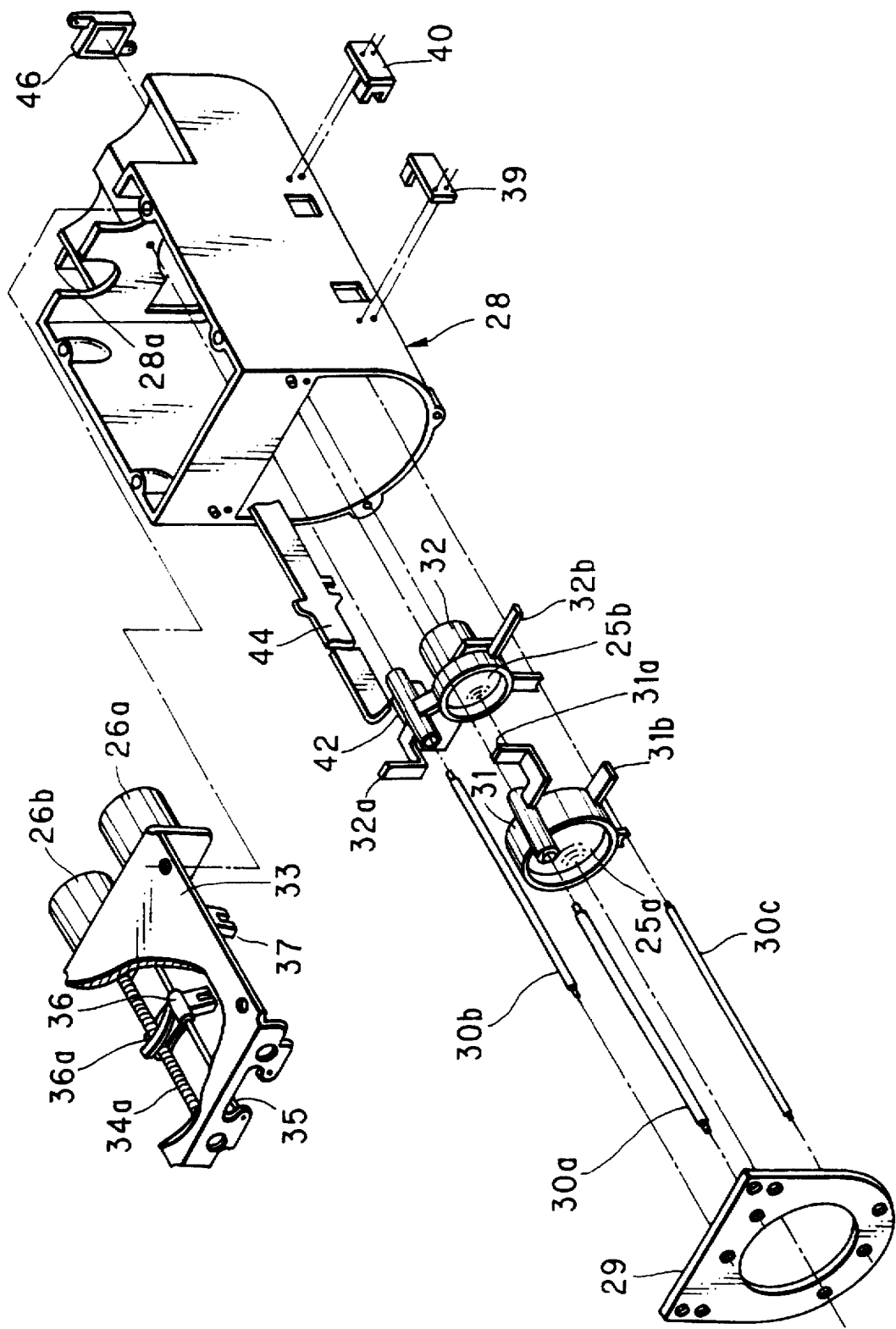
FIG. 3 is an exploded perspective illustrating mechanisms for moving a zoom optical system.

To move the lenses 25a and 25b, stepping motors 26a and 26b are individually driven. FIG. 3 illustrates a lens barrel holder 28 containing the zoom optical system 25. A top cover 29 is located above the lens barrel holder 28, namely in front of the lens barrel holder 28 as viewed in FIG. 3. Guide rods 30a, 30b and 30c are fixed between a bottom of the lens barrel holder 28 and the top cover 29, and extend in parallel with an optical axis. A focussing barrel 31 supports the focussing lens 25a, and is guided along the guide rods 30a and 30c. A variator barrel 32 supports the variator lens 25b, and is guided along the guide rods 30b and 30c.

The stepping motors 26a and 26b are secured to a support plate 33, which is fixed beside the lens barrel holder 28, namely on the top of the lens barrel holder 28 as viewed in FIG. 3. A rotary shaft 34 of the stepping motor 26b has a lead screw. A guide rod 35 is fixed on the support plate 33. A transmission member 36 is supported on the guide rod 35 movably in parallel with an optical axis. The rotary shaft 34 is helically engaged with a female screw 36a formed in the transmission member 36. Rotation of the stepping motor 26b moves the transmission member 36 up and down in parallel with the optical axis. Similarly, rotation of the stepping motor 26a moves another transmission member 37 up and down in parallel with the optical axis. The transmission members 36 and 37 have respective forks, which are engaged with projections 32a and 31a formed with the variator barrel 32 and the focussing barrel 31. The focussing barrel 31 is moved inside the lens barrel holder 28 in association with the number of drive pulses supplied to the stepping motor 26a. Similarly the variator barrel 32 is moved in association with the number of drive pulses supplied to the stepping motor 26b.

Photo sensors 39 and 40 are fixed outside the lens barrel holder 28. Light-interrupting projections 31b and 32b are respectively formed with the focussing and variator barrels 31 and 32, interrupt light, and are detected by the photo sensors 39 and 40, to detect respective return of the focussing and variator barrels 31 and 32 to home positions. The lens barrel holder 28 includes an iris diaphragm motor 42 and a Hall element 43 (See FIG. 2). The iris motor 42 operates as an actuator for adjusting a diameter of openness of an iris diaphragm 45 as illustrated in FIG. 2. The Hall element 43 magnetically monitors a shift of a magnet incorporated in the iris motor 42, and operates as a sensor for detecting the openness of the iris diaphragm 45. A reference numeral 44 designates a flexible printed board, which is adapted to supplying the iris motor 42 with driving current and receiving an output from the Hall element 43.

On a bottom of the lens barrel holder 28 is fixed an image sensor 46 to lie on the optical axis of the zoom optical system 25. An optical image is focussed by the zoom optical system 25 on a photoelectric plane of the image sensor 46, and is output by the image sensor 46 in a form converted in an photoelectric signal. The whole of the lens barrel holder 28 is incorporated in the body 2 in movable fashion in parallel with the optical axis, and is settable selectively in an advanced position 10 mm distant from the photo film 6 and a retracted position 20 mm distant from the photo film 6. The zoom optical system 25 can have a smaller pick-up range in the advanced position than in the retracted position. It is possible to set two selectable magnifications associated with the advanced and retracted positions without zooming the zoom optical system 25, only by shifting the zoom optical system 25 to an in-focus position. To detect each of the advanced and retracted positions, the lens barrel holder 28 has a tongue 28a, which is detected by a pair of micro switches 47 as illustrated in FIG. 2.

As illustrated in FIG. 2, the photoelectric signal from the image sensor 46 is regulated by a gain control amplifier 48 at a suitable level, converted into a digital signal by an A/D converter 49, and input into a digital signal processing unit 50. The processing unit 50 is controlled by a CPU 55, and includes a signal processor 50a, an AF circuit 50b, an integrator 50c, a synchronizing signal generator 50d and an interface circuit 50e. The signal processor 50a separates the photoelectric signal into a brightness or luminance signal component (Y) and chrominance signal component (C), converts them into three color signals, amplifies each of the three color signals for the white balance, and subjects those to matrix calculation and interpolating process, to generate a digital form of video signal. The video signal as a result is converted by a D/A converter 51 into an analog signal, which is output by a video amplifier 52 as a video signal of a composite form or R, G and B forms.

The AF circuit 50b receives the brightness signal from the signal processor 50a, and detects differences in the brightness signal between adjacent pixels in one zone selected from a full-frame zone FR and a central zone SP as preset inside the frame. The differences are generated as absolute values (See FIG. 5A). The differences in the brightness signal are the higher when a contrast in the image is higher. When a sum of the differences peaks, there is a condition of the highest contrast, namely an in-focus condition. This processing is equivalent to a technique in which a waveform of a brightness signal obtained serially from regularly arranged pixels is differentiated to obtain a high-frequency component, to determine an in-focus condition according to peaking of the high-frequency component. The present invention is applicable to techniques in which the brightness signal is treated in the analog form.

The AF circuit 50b outputs a focus signal as a sum of differences in the brightness signal, and supplies a register in the interface circuit 50e with the focus signal. The CPU 55 moves the focussing lens 25a while monitoring the focus signal being input. Upon peaking of the focus signal, the CPU 55 detects an in-focus condition, to determine a set position of the focussing lens 25a.

The integrator 50c receives the brightness signal from the signal processor 50a, and digitally integrates the brightness signal from one zone selected from the full-frame zone FR and the central zone SP as preset inside the frame. The integrated value is associated with brightness of the full-frame zone FR or the central zone SP. The intensity of the object light incident upon the image sensor 46 can be adjusted according to the integrated value, to control exposure automatically. To change the exposure, it is possible to change a diameter of openness of the iris diaphragm 45 or storage time of charge in the image sensor 46. If the output level of the photoelectric signal is insufficiently changed, it is further possible to adjust gain of the amplifier 48 to control the exposure.

The synchronizing signal generator 50d inputs a synchronizing signal into the CPU 55 and a sensor driver 56 for driving the image sensor 46, and causes the CPU 55 and the sensor driver 56 to operate in synchronism. The circuits in the processing unit 50 are also supplied with the synchronizing signal. The image sensor 46, the processing unit 50 and the CPU 55 are driven in synchronism.

The CPU 55 supplies a focus driver 58 and a zoom driver 59 with a drive signal. The drivers 58 and 59 supply the stepping motors 26a and 26b with drive pulses in the numbers associated with input drive signals, to move the lenses 25a and 25b in parallel with the optical axis. The drivers 58 and 59 respond to commands from the CPU 55, set the frequency of the drive pulses selectively at high and low levels, and set the electric current at great and small amounts. When the stepping motors 26a and 26b are driven at the high speed, the current is set greater to avoid their out-of-step state.

In the setup AF control, the CPU 55 controls the focussing driver 58 and the zoom driver 59 to supply the stepping motors 26a and 26b with drive pulses of high frequency and greater current, which is described later in detail. The variator lens 25b is moved at high speed to a preset magnification position preset at a Telephoto terminus. This is a step of the "setup magnification changing", which is effected by cooperation of the CPU 55, a setup AF program stored in a ROM area of a memory 70, and the zoom driver 59.

After the set position of the focussing lens 25a is determined by the setup AF control, the variator lens 25b is returned to the initial magnification position. The focussing lens 25a is controlled to move to a set position which is obtained in accordance with the preset magnification position of the variator lens 25b on the Telephoto side, and the tracking data stored in an EEPROM area of the memory 70. This is a step effected by cooperation of the CPU 55, the setup AF program stored in the ROM area, the tracking data in the EEPROM area, the focussing driver 58 and the zoom driver 59.

An iris driver 60 receives an iris drive signal having an analog form converted by a D/A converter 61. The iris motor 42 is responsively rotated to control the open diameter of the iris diaphragm 45. Fluorescent lamps in the light source units 5 are driven by a power source circuit 63, a DC/DC converter 64 and the inverter 65. The CPU 55 receives a signal from the inverter 65, and monitors the on and off states of the fluorescent lamps.

A signal from the Hall element 43 in association with the open diameter of the iris diaphragm 45 is entered into an amplifier 66, converted through an A/D port, and fed back to the CPU 55. When the focussing barrel 31 and the variator barrel 32 pass the respective home positions, signals from the photo sensors 39 and 40 are input into the CPU 55. Also a signal from the micro switches 47 is input into the CPU 55.

There are manual inputs 68 and manual volume dials 69, through which signals are input in association with the switches 12, 13, 15, 22, 23 and 24 and the manual volume dials 16–20. The CPU 55 executes various pick-up sequences in accordance with those signals. A program of the pick-up sequences are stored in a ROM area of the memory 70. In a RAM area of the memory 70, various flags and data are written and read during execution of the pick-up sequences. Data required for executing the program in various manners to the EEPROM area of the memory 70 in the factory manufacturing the image inputting apparatus.

Figure 4:
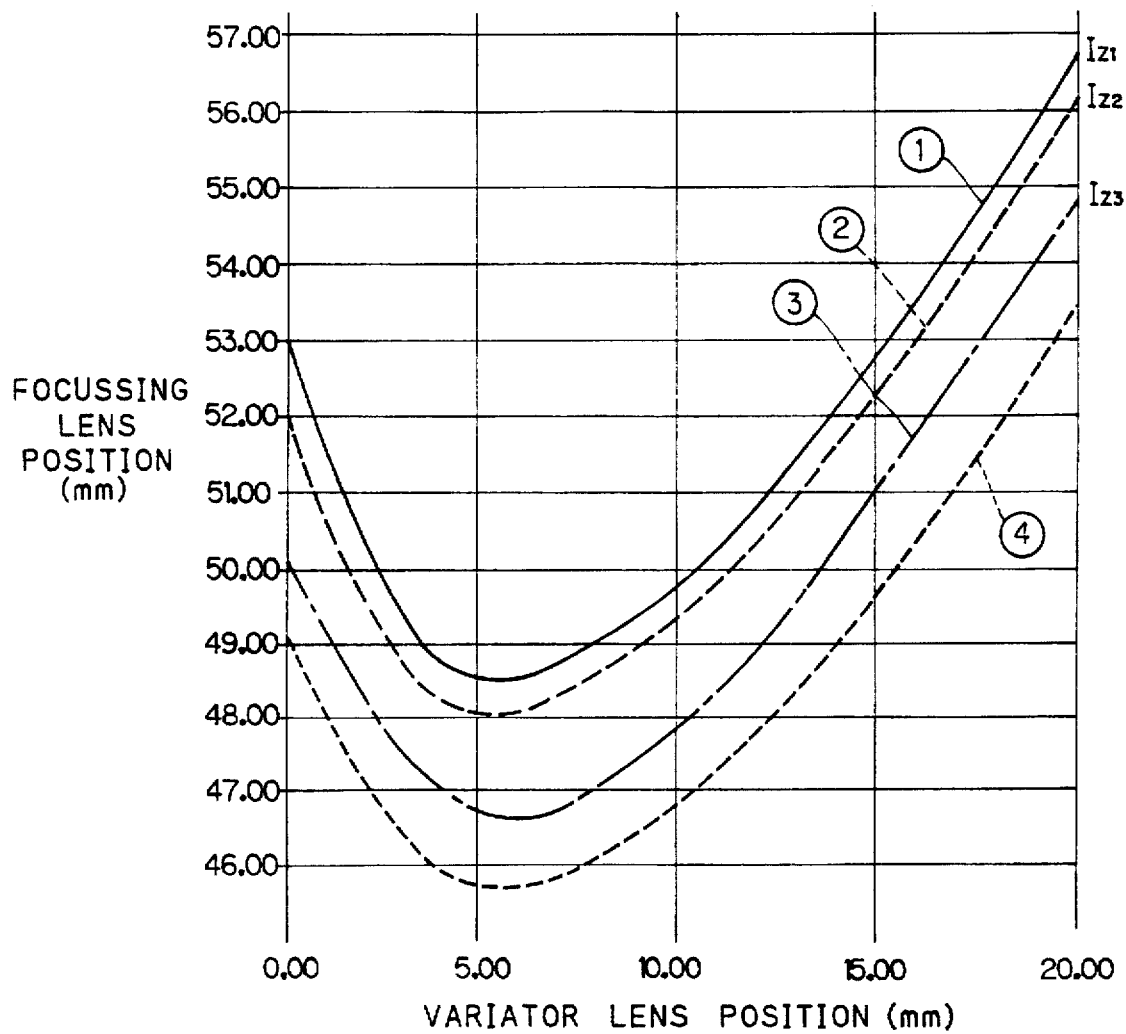
FIG. 4 is a graph illustrating tracking data associated with a variator lens and a focussing lens.

The EEPROM area of the memory 70 stores the tracking adjusting data which can be indicated in the curves of FIG. 4. The position of the variator lens 25b is taken on a transverse axis of the graph of FIG. 4. The home position is defined at a Wide-angle terminus. The Telephoto terminus is 20.00 mm distant from the home position. The position of the focussing lens 25a is taken on an ordinate of the graph. The tracking data (1)–(4) are preset in association respectively with four subject distances (object distances) frequently used in the image inputting apparatus. In the tracking data (1) for example, the zoom optical system 25 can be focussed by stopping the focussing lens 25a at 52.8 mm when the variator lens 25b is stopped at 15 mm.

The tracking data (1)–(4) are associated with respective pick-up modes:

Tracking data (1) is associated with a first pick-up mode, where an image on the photo film 6 set in the support 4 is picked up with the lens barrel holder 28 moved to the advanced position nearer to the photo film 6. The subject distance is set approximately 10 mm, which is the shortest. The first pick-up mode is adapted to picking up an image frame photographed on the photo film 6 in a horizontal orientation.

Tracking data (2) is associated with a second pick-up mode, where an image on the photo film 6 set in the support 4 is picked up with the lens barrel holder 28 moved to the retracted position farther from the photo film 6. The subject distance is set approximately 20 mm, which is longer than that of the first pick-up mode. The second pick-up mode is adapted to picking up an image frame photographed on the photo film 6 in a vertical orientation, without vignetting in the picking up.

Tracking data (3) is associated with a third pick-up mode, where the body 2 is installed upside down with the support legs 9 widely open, to pick up a photo print placed under the body 2. The subject distance is set approximately 50 mm. The lens barrel holder 28 remains in the advanced position nearer to the photo film 6.

Tracking data (4) is associated with a fourth pick-up mode, where the body 2 manually held horizontally like an ordinary video camera, to target articles as object to be picked up. The subject distance is set infinity. Tracking data (4) is used for limiting the positions.

When the first, second or third pick-up mode is selected through the mode selector 15, a reference value $Zt1$, $Zt2$ or $Zt3$ at the Telephoto terminus is selected as reference for calculating the tracking data. The reference values at the Telephoto terminus in the respective pick-up modes are rewritten each time of effecting the setup AF operation.

Figure 5:
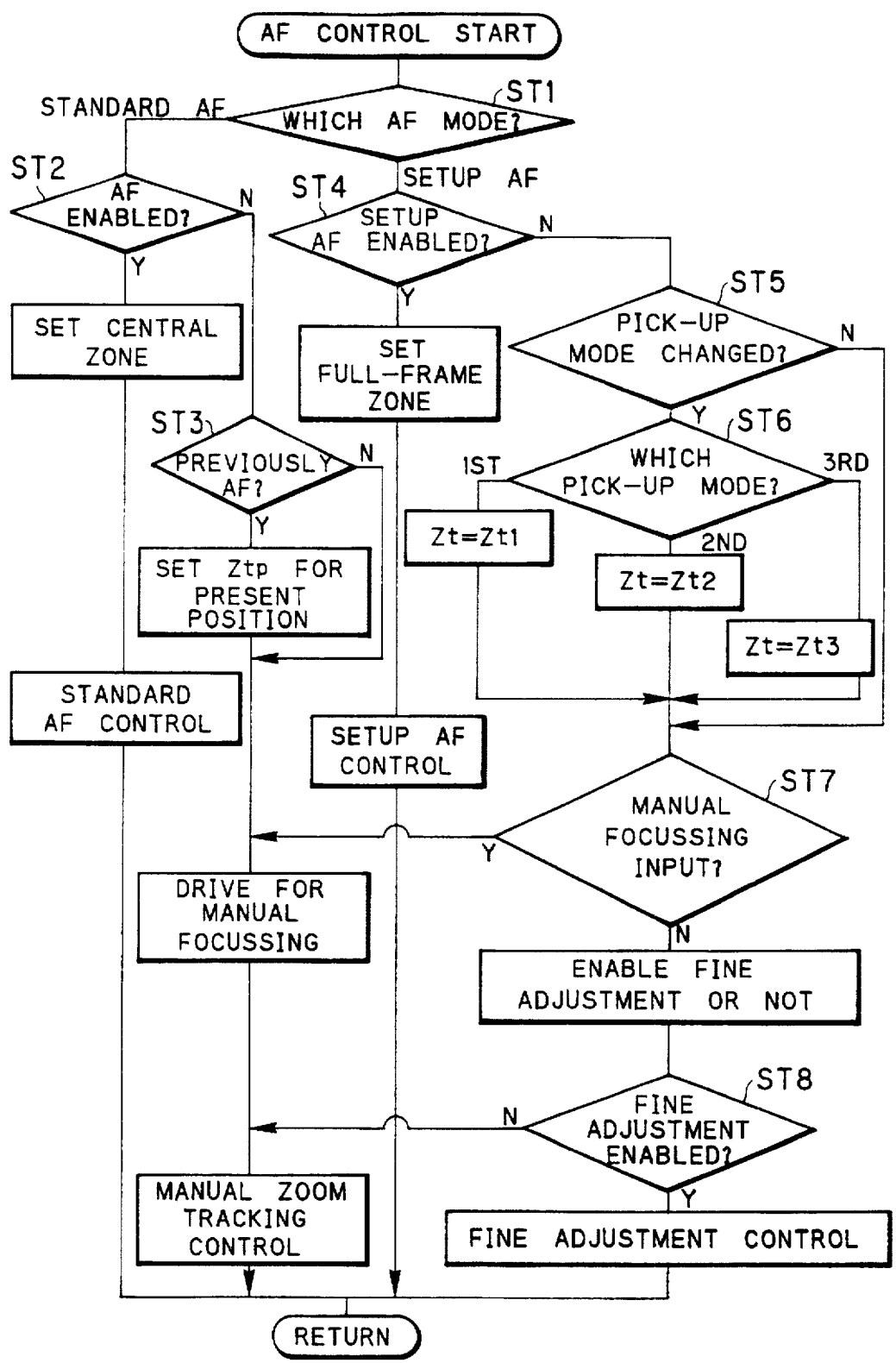
FIG. 5 is a flow chart illustrating a flow of focussing controls.

In operation of the auto focussing of the image inputting apparatus as constructed above, a main flow in FIG. 5 is referred to first. The CPU 55, in the ST1, determines which of the standard AF mode and the setup AF mode should be executed. If the first, second or third pick-up mode is set at the mode selector 15, then the setup AF mode is selected to come to the ST4. If the fourth pick-up mode is set at the mode selector 15, then the standard AF mode is selected to come to the ST2.

In the standard AF mode, selection of either of the AF and the manual focussing through the AF switch 22 is detected in the ST2. When the AF is selected, an LED disposed near to the AF switch 22 is turned on. The standard AF control is effected. In response to the brightness signal from the signal processor 50a, the AF circuit 50b generates the focus signal, which is entered into the CPU 55 via the interface circuit 50e. It is to be noted that the standard AF mode is used differently from the first, second and third pick-up modes and adapted to the manual handling by way of an ordinary video camera. Only the central zone SP in the frame in FIG. 5A is used for the AF circuit 50b to obtain the focus signal. No background and no nearer object is focussed in the standard AF mode. Note that a reference sign S designates a principal object.

The CPU 55 monitors the focus signal being input successively, and causes the focussing driver 58 to drive the stepping motor 26a, to control the focussing lens 25a to move until the focus signal peaks. The moving control is effected successively each time when photoelectric signals from one frame are output from the image sensor 46.

When the manual focussing is selected in the ST2, then it is judged in the ST3 which of the AF and the manual focussing was effected at the previous focussing. If the previous focussing is the AF, then a position at the Telephoto terminus in association with a presently set position of the focussing lens 25a is calculated, to set the calculated position in the variable Ztp of reference value at the Telephoto terminus.

When there is an input through the manual focussing switch 23, the focussing lens 25a is controlled to move according to the input. FIG. 4 illustrates the four curves of the tracking data. For points between the curves, the image inputting apparatus is constructed to calculate interpolation of each set of two positions on the basis of two curves between which the point lies. After obtaining the tracking data with or without interpolation, a manual zoom tracking control is effected. With the variator lens 25b stopped in a position set through the zoom switch 24, the set position of the focussing lens 25a is controlled to change according to the tracking data as calculated.

If the setup AF mode is selected in the ST1, then the setup AF control is entered upon operation of the AF switch 22 in the ST4. Unlike the standard AF control, an object to be picked up is a flat object in the setup AF control. The measuring zone is changed to the full-frame zone FR. The processing unit 50 generates the focus signal in accordance with the brightness signal output from the signal processor 50a regarding the full-frame zone FR. The setup AF control is illustrated in FIG. 6, and is described later in detail.

In the setup AF mode, if the AF switch 22 is not operated, then the ST5 is entered, to monitor whether there is a change in the pick-up mode. If the selected pick-up mode is not changed, then the routine comes from the ST5 to the ST7. When there is an input through the manual focussing switch 23, the focussing lens 25a is controlled to move according to the input.

If no input from the manual focussing switch 23 exists in the ST7, it is judged whether fine adjustment processing is required or not. In the fine adjustment processing, the focussing lens 25a is minutely moved in a range where a shift of focus is substantially inconspicuous. The focus signal is subjected to comparison between values before and after the minute movement. If the focus signal has a decrease, then the driving direction is reversed. If the focus signal has no decrease, then the driving direction is kept unchanged. As a result, the position of the focussing lens 25a is adjusted by setting the peak of the focus signal. In general the fine adjustment is used when the focus signal has a change beyond a certain limit.

A change in the focus signal beyond the limit takes place, for example, when the photo film holder 7 set as illustrated in FIG. 2 is moved to pick up another frame after effecting the focussing. There is very little change in the subject distance. But the image in the frame changes. The brightness signal from the signal processor 50a is remarkably changed, to change the focus signal. To be precise, the fine adjustment processing is executed when a scene being picked up is changed. Also, the fine adjustment processing is effective in overcoming shifts of focus caused by a curl in the photo film, mechanical play existing in supporting the photo film holder 7, a change in the open diameter of the iris diaphragm 45 due to the change in the scene.

There is an operation of a limiter, associated with the fine adjustment processing, for preventing the position of the focussing lens 25a from coming conspicuously away from the tracking data as calculated. The EEPROM area of the memory 70 stores limit data, by use of which the drive signal from the CPU 55 to the focussing driver 58 is limited after the start of the fine adjustment processing. The fine adjustment processing is canceled upon entry of an input of the manual focussing.

If there is a change in the pick-up mode in the ST5, the set position of the mode selector 15 is checked, to detect a selected one of the first, second and third pickup modes. One of the reference values Zt1, Zt2 and Zt3 at the Telephoto terminus, which are preset respectively for the pick-up modes, is selected. Any selected one of Zt1, Zt2 and Zt3 is set in the variable Ztp for calculating the tracking data after the zooming. The selected tracking data remains effective before another change in the pick-up mode. When the zoom switch 24 is operated, the focussing lens 25a is controlled to move as well as the variator lens 25b is moved.

With one of the first, second and third pick-up modes selected, the AF switch 22 is operated. The measuring zone is changed to the full-frame zone FR in the ST4, to enter the setup AF control illustrated in FIG. 6. The setup AF control includes four steps which are associated with Command Code 1–4. The ST10 checks which one of the Command Codes is effective. In a flow of a main routine for controlling the entire sequence of operating the image inputting apparatus, various steps are executed one after another. At the start of the setup AF control, a subroutine of Command Code 1 is effected. At first, a position of the variator lens 25b upon operation of the AF switch 22 is written to the memory 70. Then Command Code 1 is reset while Command Code 2 is set, to terminate the subroutine.

When the setup AF control is called in the main flow, a subroutine of Command Code 2 is effected. The variator lens 25b is moved to the Telephoto terminus. The CPU 55 supplies the zoom driver 59 with drive pulses for high-speed rotation. The setup AF control can be effected by fast movement of the variator lens 25b toward the Telephoto terminus, as compared with the zooming commanded through the zoom switch 24 before entry into the setup AF control.

Let the variator lens 25b be located in the Wide-angle terminus when the AF switch 22 is operated. It is impossible for the variator lens 25b to move to the Telephoto terminus only at one time of the subroutine. The subroutine is terminated without changing Command Code 2. Upon calling the setup AF control again, the subroutine of Command Code 2 is entered for a second time. Then the zoom optical system 25 is moved to the Telephoto terminus. Command Code 3 is assigned now.

The setup AF control is called again, to set Command Code 3 for effecting the focussing through the AF circuit 50b. The image magnification is kept maximum in the focussing, as the variator lens 25b is positioned in the Telephoto terminus. As the object to be picked up is the photo film, emulsion grains in dispersed distribution on the photo film support are utilized to be focussed. It is therefore possible to focus the object to be picked up even when there is no high-contrast object in the measuring zone. The iris diaphragm 45 is fully opened during the focussing, so that the depth of focus is set small. To adjust the output level of the photoelectric signal, storage time of charge in the image sensor 46 is changed, or the gain of the amplifier 48 is changed.

The auto focussing determines the reference value Ztp at the Telephoto terminus for calculation of the tracking data. One of Zt1, Zt2 and Zt3 is rewritten to be the reference value Ztp at the Telephoto terminus in accordance with the present one of the pick-up modes. Then Command Code 3 is changed to Command Code 4. The present subroutine is terminated.

Command Code 4 is set, to read the initial position data of the variator lens 25b at the time of operating the AF switch 22, namely the position data written to the memory 70 while Command Code 1 was set. The variator lens 25b is moved back to the initial position in accordance to the initial position data as read. To move back the variator lens 25b, the zoom driver 59 is supplied with drive pulses for high-speed rotation. The variator lens 25b can be moved faster the zooming commanded through the zoom switch 24 before entry into the setup AF control.

The tracking data according to the subject distance has been calculated from the set position ztp of the focussing lens 25a at the Telephoto terminus. It is possible uniquely to obtain a position to which the focussing lens 25a should move in association with a position of the variator lens 25b. The CPU 55 supplies the focussing driver 58 with drive pulses in accordance with the tracking data, to cause the focussing lens 25a to move to an in-focus position associated with the first magnification position. To stand by for next time of the setup AF control, Command Code 4 is changed to Command Code 1. A command of the setup AF control is cleared, to finish the setup AF control.

This being so, the setup AF control makes it possible to focus in the magnification position at the time of operating the AF switch 22. Then the fine adjustment processing, when desired, is executed by following the flow of FIG. 5 from the ST8, as long as there is no further input for focussing. Note that, when the image inputting apparatus is initially powered, the focussing lens 25a and the variator lens 25b are once moved to the home positions, and detected by the photo sensors 39 and 40 for the movement thereto. The numbers of the drive pulses supplied during this are counted by the CPU 55 to detect the set positions of the lenses 25a and 25b with reference to the home positions. Then the lenses 25a and 25b are moved back to initial set positions upon the powering. It is possible subsequently to track the set positions of the focussing lens 25a and the variator lens 25b with reference to the home positions.

When the image inputting apparatus is initially powered, the initializing regulating values IZ1, IZ2 and IZ3 are set in the variables Zt1, Zt2 and Zt3. One of the pick-up modes are designated according to the set position of the mode selector 15. Tracking data associated with the designated mode is selected and calculated. When the magnification is changed by the zooming, the focussing lens 25a is controlled to move in accordance with the tracking data. When the micro switches 47 detect the movement of the lens barrel holder 28 to the retracted position, then Zt2 is set in the reference value Ztp at the Telephoto terminus. For the setup AF control, it is effective to stabilize a white balance control, and limit a feedback gain in the exposure control, so as to render changes inconspicuous in the color balance and brightness during the zooming.

The present invention is of course applicable to various pick-up devices incorporating a zoom optical system and a solid-state pick-up element. In the above embodiment, the preset position to which the variator lens 25b is moved is the Telephoto terminus for the setup AF control. However it is possible in the present invention that the stepping motor 26b is moved to a predetermined telephoto position of a certain high magnification. The present invention is also applicable to a zoom optical system in which a cam barrel is used for driving the lenses 25a and 25b. In the above embodiment the AF device is a contrast detecting type. The present invention is applicable to other types of AF devices, such as a phase difference detecting type.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An auto focussing method for a zoom optical system, an image sensor being disposed behind said zoom optical system for picking up an object, said zoom optical system being focussed by use of a photoelectric signal from said image sensor, said auto focussing method comprising steps of:

in a setup mode, zooming said zoom optical system from a first magnification to a preset magnification, said zoom optical system having been set at said first magnification, said preset magnification being adapted to focussing;

focussing said zoom optical system in accordance with said photoelectric signal generated while said zoom optical system has said preset magnification; and zooming said zoom optical system back from said preset magnification to said first magnification, while keeping said zoom optical system in-focus, whereby said zoom optical system becomes in-focus at said first magnification in accordance with said focussing at said preset magnification and with predetermined tracking data.

2. An auto focussing method as defined in claim 1, wherein said preset magnification is preset high by one telephoto position in a zoomable range of said zoom optical system.

3. An auto focussing method as defined in claim 2, further comprising steps of:

evaluating said photoelectric signal generated while said zoom optical system has said preset magnification;

focussing said zoom optical system in accordance with evaluation of said photoelectric signal, to form an image of said object on said image sensor in optimized fashion, whereby said zoom optical system is set in a reference in-focus condition;

obtaining a first in-focus condition in accordance with said reference in-focus condition, said first in-focus condition being adapted to focussing said zoom optical system when at said first magnification; and resetting said zoom optical system from said reference in-focus condition to said first in-focus condition, at a same time as said zoom optical system is zoomed back from said preset magnification to said first magnification.

4. An auto focussing method as defined in claim 3, wherein said zoom optical system includes:

a variator lens, being movable on an optical axis to zoom, and having a magnification position according to which a magnification is determined; and a focussing lens, being movable on said optical axis to focus, for forming said object image on said image sensor.

5. An auto focussing method as defined in claim 4, further comprising steps of:

presetting plural tracking data, each of said tracking data representing a combination of said magnification position and an in-focus position of said focussing lens set on an in-focus condition, there being plural reference in-focus positions which said focussing lens has on said reference in-focus condition, said plural tracking data being associated respectively with said plural reference in-focus positions at said preset magnification;

reading a first in-focus position in accordance with said tracking data, said focussing lens having said first in-focus position on said first in-focus condition, said first in-focus position being combined with a first magnification position, said variator lens having said first magnification position when at said first magnification, whereby said focussing lens is set in said first in-focus position when said variator lens is moved back to said first magnification position.

6. An auto focussing method as defined in claim 5, further comprising steps of:

in said setup mode, moving said focussing lens within a predetermined range while said variator lens is stopped at said preset magnification;

obtaining contrast of an image of said object formed on said image sensor in accordance with said photoelectric signal while said focussing lens is moved; and stopping said focussing lens when said contrast is optimized, thereby to obtain one of said reference in-focus positions.

7. An auto focussing method as defined in claim 6, further comprising steps of:

minutely moving said focussing lens after said focussing lens is moved to said first in-focus position and said variator lens is moved back to said first magnification;

evaluating said contrast of an image of said object formed on said image sensor while said focussing lens is minutely moved; and stopping said focussing lens in accordance with evaluation of said contrast of said image, to finely adjust said first in-focus position according to said tracking data.

8. An auto focussing method as defined in claim 7, further comprising steps of:

presetting an upper limit within which said focussing lens is minutely movable; and if said focussing lens comes to have said upper limit while moved minutely, stopping said focussing lens forcibly, to limit said fine adjustment.

9. An auto focussing method as defined in claim 7, further comprising a step of selecting one of a standard mode and said setup mode, wherein when said standard mode is selected, then said zoom optical system is set at said first magnification and focussed directly without use of said predetermined magnification.

10. An auto focussing method as defined in claim 9, wherein said zoom optical system includes:

an iris diaphragm for adjusting an amount of light passed therethrough from said object;

further comprising steps of:

fully opening said iris diaphragm upon selecting of said setup mode; and regulating said photoelectric signal at a level adapted to being evaluated in focussing.

11. An auto focussing method as defined in claim 10, wherein said photoelectric signal is regulated by controlling storage time of said image sensor.

12. An auto focussing method as defined in claim 10, wherein there is an amplifier connected to said image sensor for amplifying said photoelectric signal, and said photoelectric signal is regulated by adjusting a gain of said amplifier.

13. An auto focussing method for a zoom optical system, said zoom optical system including a variator lens movable on an optical axis to zoom, and a focussing lens movable on said optical axis to focus, an image sensor being disposed behind said zoom optical system for picking up an object, said focussing lens being moved in accordance with a photoelectric signal from said image sensor, to focus said zoom optical system, said auto focussing method comprising the steps of:

in a setup mode, moving said variator lens from a first magnification position to a preset magnification position, said variator lens having been set at said first magnification position to zoom said zoom optical system, said preset magnification position being adapted to focussing;

moving said focussing lens to a reference in-focus position in accordance with said photoelectric signal generated while said variator lens has said preset magnification position, to focus said zoom optical system;

obtaining a first in-focus position of said focussing lens in accordance with said reference in-focus position, said first in-focus position being determined for focussing said zoom optical system when said variator lens has said first magnification position;

moving said focussing lens from said reference in-focus position to said first in-focus position; and at a same time as said focussing lens is moved to said first in-focus position, moving said variator lens back from said preset magnification position to said first magnification position, while keeping said zoom optical system in-focus, wherein said zoom optical system becomes in-focus at said first magnification in accordance with said focussing at said preset magnification and with predetermined tracking data.

14. An auto focussing method for a zoom optical system, an image sensor being disposed behind said zoom optical system for picking up an object, said zoom optical system being focussed by use of a photoelectric signal from said image sensor, said auto focussing method comprising steps of:

presetting first and second measuring zones in a frame of said image sensor, said first and second measuring zones being adapted to restricting said photoelectric signal for use in focussing;

selecting one of a standard mode and a setup mode, wherein when said standard mode is selected, then said first measuring zone is selected to render effective said photoelectric signal from an inside of said first measuring zone, and when said setup mode is selected, then said second measuring zone is selected to render effective said photoelectric signal from an inside of said second measuring zone;

in said standard mode, zooming said zoom optical system directly to a first magnification upon setting said first magnification;

when said zoom optical system is zoomed directly to said first magnification, setting said zoom optical system to an in-focus condition in accordance with said first magnification and said photoelectric signal at said first magnification;

presetting a preset magnification adapted to focussing;

in said setup mode, zooming said zoom optical system from said first magnification to said preset magnification upon setting said first magnification; and when said zoom optical system is zoomed from said first magnification to said preset magnification, setting said zoom optical system to an in-focus condition in accordance with said preset magnification, said photoelectric signal at said preset magnification, and with predetermined tracking data.

15. An auto focussing method as defined in claim 14, wherein said zoom optical system including:

a variator lens, being movable on an optical axis to zoom, and having a magnification position according to which a magnification is determined; and a focussing lens, being movable on said optical axis to focus, for forming said object image on said image sensor;

wherein in said setup mode and after said zoom optical system is set in-focus with said preset magnification, said zoom optical system is zoomed back from said preset magnification to said first magnification, while keeping said zoom optical system in-focus;

wherein said preset magnification is preset high by one telephoto position in a zoomable range of said zoom optical system; and wherein said first zone is located in a center of said frame, and said second zone comprises entirety of said frame.

16. An auto focussing method as defined in claim 14, wherein in said setup mode, at least emulsion grains on photographic film are used to form an image thereon at said preset magnification in focussing said zoom optical system.

17. An auto focussing device for a zoom optical system, an image sensor being disposed behind said zoom optical system for picking up an object, said zoom optical system being focussed by use of a photoelectric signal from said image sensor, said auto focussing device comprising:

- a first moving mechanism for shifting said zoom optical system to change a magnification thereof;
- a second moving mechanism for shifting and focussing said zoom optical system;
- a memory, to which information of said magnification is written with said zoom optical system shifted, and which previously stores information of a preset magnification being adapted to focussing said zoom optical system; and
- a controller for accessing said memory and for controlling said first and second moving mechanisms;
- in a setup mode, said controller writing information of a first magnification to said memory upon setting said zoom optical system set at said first magnification;
- said controller reading said information of said preset magnification from said memory;
- said controller causing said first moving mechanism to zoom said zoom optical system from said first magnification to said preset magnification;
- said controller causing said second moving mechanism to focus said zoom optical system in accordance with said photoelectric signal generated while said zoom optical system has said preset magnification; and
- said controller reading said information of said first magnification from said memory;
- said controller causing said first moving mechanism to zoom said zoom optical system back from said preset magnification to said first magnification, while keeping said zoom optical system in-focus, wherein said zoom optical system becomes in-focus at said first magnification in accordance with said focussing at said preset magnification and with predetermined tracking data.

18. An auto focussing device as defined in claim 17, wherein said preset magnification is preset high by one telephoto position in a zoomable range of said zoom optical system.

19. An auto focussing device as defined in claim 18, wherein said controller evaluates said photoelectric signal generated while said zoom optical system has said preset magnification; and causes said second moving mechanism to focus said zoom optical system in accordance with evaluation of said photoelectric signal, to form an image of said object on said image sensor in optimized fashion, whereby said zoom optical system is set in a reference in-focus condition;

said memory further previously stores tracking data, said tracking data representing information in combination of a magnification and an in-focus condition, said tracking data combining said reference in-focus condition with said preset magnification;

said controller reads information of a first in-focus condition from said memory in accordance with said reference in-focus condition and said tracking data, said first in-focus condition being adapted to focussing said zoom optical system when at said first magnification; said controller causes said second moving mechanism to shift said zoom optical system from said reference in-focus condition to said first in-focus condition; and at a same time, said controller causes said first moving mechanism to zoom said zoom optical system back from said preset magnification to said first magnification.

20. An auto focussing device as defined in claim 19, wherein said zoom optical system includes:

a variator lens, driven by said first moving mechanism to move on an optical axis to zoom, and having a magnification position according to which a magnification is determined; and a focussing lens, driven by said second moving mechanism to move on said optical axis to focus, for forming said object image on said image sensor;

wherein said tracking data comprises plural tracking data, each of said tracking data representing a combination of said magnification position and an in-focus position of said focussing lens set on an in-focus condition, there being plural reference in-focus positions which said focussing lens has on said reference in-focus condition, said plural tracking data being associated respectively with said plural reference in-focus positions at said preset magnification.

21. An auto focussing device as defined in claim 20, wherein said first moving mechanism includes:

a first motor associated with said variator lens; and a zoom driver, controlled by said controller, for driving said first motor;

said second moving mechanism includes:

a second motor associated with said focussing lens; and a focussing driver, controlled by said controller, for driving said second motor.

22. An auto focussing device as defined in claim 20, wherein said controller causes said second moving mechanism to move said focussing lens within a predetermined range while said variator lens is stopped at said preset magnification;

further comprising:

an auto focussing circuit, connected to said image sensor, for generating a focus signal representing sharpness of an image of said object formed on said image sensor in accordance with said photoelectric signal while said focussing lens is moved;

wherein said controller stops said second moving device and said focussing lens when said focus signal is optimized, thereby to obtain one of said reference in-focus positions.

23. An auto focussing device as defined in claim 22, wherein said controller causes said second moving mechanism minutely to move said focussing lens after said focussing lens is moved to said first in-focus position and said variator lens is moved back to said first magnification;

said auto focussing circuit generates said focus signal while said focussing lens is minutely moved; and said controller causes stops said second moving device and said focussing lens when said focus signal is optimized, finely to adjust said first in-focus position according to said tracking data.

24. An auto focussing device as defined in claim 23, wherein said memory further previously stores an upper limit within which said focussing lens is minutely movable; and said controller reads said upper limit from said memory, and if said focussing lens comes to have said upper limit while moved minutely, stops said second moving device and said focussing lens forcibly, to limit said fine adjustment.

25. An auto focussing device as defined in claim 23, further comprising a mode selector, externally operable for selecting one of a standard mode and said setup mode, wherein when said standard mode is selected, then said controller causes said second moving mechanism to focus said zoom optical system having said first magnification, directly without use of said predetermined magnification.

26. An auto focussing device as defined in claim 25, wherein said controller causes said first moving mechanism to move said variator lens at higher speed when said setup mode is selected than when said standard mode is selected through said mode selector.

27. An auto focussing device as defined in claim 25, further comprising:
   an iris diaphragm, disposed in said zoom optical system, for adjusting an amount of light passed therethrough from said object;
   an iris driver, controlled by said controller, for driving said iris diaphragm, and when said setup mode is selected through said mode selector, said iris driver fully opening said iris diaphragm; and
   a signal regulator for regulating said photoelectric signal at a level adapted to being input in said auto focussing circuit.

28. An auto focussing device as defined in claim 27, wherein said signal regulator controls storage time of said image sensor.

29. An auto focussing device as defined in claim 28, further comprising an amplifier, controlled by said controller, for amplifying said photoelectric signal from said image sensor to supply said auto focussing circuit therewith;
   wherein said signal regulator comprises said controller and adjusts a gain of said amplifier.

30. An auto focussing device for a zoom optical system, said zoom optical system including a variator lens movable on an optical axis to zoom, and a focussing lens movable on said optical axis to focus, an image sensor being disposed behind said zoom optical system for picking up an object, said focussing lens being moved in accordance with a photoelectric signal from said image sensor, to focus said zoom optical system, said auto focussing device comprising:
   a first moving mechanism for moving said variator lens to zoom said zoom optical system;
   a second moving mechanism for moving said focussing lens to focus said zoom optical system;
   a memory for previously storing a preset magnification position being adapted to focussing, and first and second measuring zones in a frame of said image sensor, said first and second measuring zones being adapted to restricting said photoelectric signal for use in focussing;
   a mode selector, externally operable for selecting one of a standard mode and a setup mode; and
   a controller, connected to said memory and said mode selector, for controlling said first and second moving mechanisms;
   wherein, when said standard mode is selected through said mode selector, said controller causes said first moving mechanism to move said variator lens directly to a first magnification position upon setting said first magnification position;
   said controller reads said first measuring zone from said memory;
   said controller renders effective said photoelectric signal from an inside of said first measuring zone; and
   said controller causes said second moving mechanism to move said focussing lens to an in-focus position in accordance with said first magnification position and said photoelectric signal at said first magnification position; and
   wherein, when said setup mode is selected through said mode selector, said controller reads said preset magnification position and said second measuring zone upon setting said first magnification position;
   said controller causes said first moving mechanism to move said variator lens from said first magnification position to said preset magnification position upon setting said first magnification position;
   said controller renders effective said photoelectric signal from an inside of said second measuring zone; and
   said controller causes said second moving mechanism to move said focussing lens to an in-focus position in accordance with said preset magnification position and said photoelectric signal at said preset magnification position and with predetermined tracking data.

31. An auto focussing method as defined in claim 13, wherein said tracking data varies for different subject distances.

32. An auto focussing method as defined in claim 14, wherein said tracking data varies for different subject distances.

33. An auto focussing device as defined in claim 30, wherein said tracking data varies for different subject distances.

* * * * *